United States Patent
Kanbe et al.

(10) Patent No.: US 7,152,500 B2
(45) Date of Patent: Dec. 26, 2006

(54) PEDAL STRUCTURE FOR MOTOR VEHICLES

(75) Inventors: Kazunari Kanbe, Chiryu (JP); Satoshi Tokuyama, Kariya (JP); Nobutomo Higashi, Toyota (JP); Yasushi Murayama, Aichi-ken (JP)

(73) Assignee: Advics Co., Ltd., Kariya (JP)

( * ) Notice: Subject to any disclaimer, the term of this patent is extended or adjusted under 35 U.S.C. 154(b) by 152 days.

(21) Appl. No.: 10/714,930

(22) Filed: Nov. 18, 2003

(65) Prior Publication Data

US 2004/0144199 A1     Jul. 29, 2004

(30) Foreign Application Priority Data

Nov. 27, 2002   (JP)  ............... 2002-344405

(51) Int. Cl.
    *G05G 1/16*     (2006.01)
(52) U.S. Cl. .......................... 74/563; 74/560
(58) Field of Classification Search ................ 74/512, 74/513, 560, 561, 562, 562.5, 563
See application file for complete search history.

(56) References Cited

U.S. PATENT DOCUMENTS

| | | | |
|---|---|---|---|
| 4,404,439 A | * | 9/1983 | Leighton ................ 200/61.89 |
| 5,321,995 A | * | 6/1994 | Zedan ........................... 74/563 |
| 5,609,069 A | * | 3/1997 | Swenson ....................... 74/563 |
| 5,738,180 A | * | 4/1998 | Hofmann et al. ............ 180/291 |
| 5,884,534 A | * | 3/1999 | Knoll et al. ................... 74/562 |
| 6,513,407 B1 | * | 2/2003 | Higgins ......................... 74/560 |
| 6,622,592 B1 | * | 9/2003 | Lee ............................... 74/563 |

FOREIGN PATENT DOCUMENTS

EP     1413482 A1   *   4/2004
JP     11-321593     11/1999

* cited by examiner

*Primary Examiner*—Vicky A. Johnson
(74) *Attorney, Agent, or Firm*—Buchanan Ingersoll & Rooney PC

(57) ABSTRACT

A parking brake pedal structure is disclosed, wherein a parking brake pedal comprises a pedal arm and a pedal pad mounted at an end portion of the pedal arm. The pedal arm includes an arm body and an arm end portion for mounting the pedal pad thereon. The arm end portion includes a pad mounting upper portion for mounting the pedal bad thereon and a pad mounting side portion for mounting the pedal pad side portion of the pedal pad thereon. The pad mounting side portion is provided with a protruding portion which laterally protrudes to the same height as the thickness of the pedal pad side portion. The protruding portion advantageously prevents the driver's foot from being caught by the pedal pad side portion of the pedal pad. Therefore, it hardly occurs that the driver's foot is caught by the pedal pad.

6 Claims, 6 Drawing Sheets

PEDAL STRUCTURE FOR MOTOR VEHICLES

INCORPORATION BY REFERENCE

This application is based on and claims priority under 35 U.S.C. sctn. 119 with respect to Japanese Application No. 2002-344405 filed on Nov. 27, 2002, the entire content of which is incorporated herein by reference.

BACKGROUND OF THE INVENTION

1. Field of the Invention

The present invention relates to a pedal structure at an end portion of a pedal for motor vehicles such as for example pedal for parking foot brake device, brake pedal, accel or gas pedal or the like 2. Discussion of the Related Art Over the floor ahead of a driver's seat in a motor vehicle, there are usually provided a pedal for a parking foot brake device, a brake pedal and a gas or accel pedal. For example, the pedal for the parking foot brake device is arranged over the floor ahead of the driver's seat in juxtaposed relation with the brake pedal. The construction of a known parking brake device is such that a parking brake pedal is stepped on to work the parking brake to be locked and then, the driver's foot can be put off the parking brake pedal, as described in Japanese unexamined, published patent application No. 11-321593.

As shown in FIGS. 7 to 9, a pedal pad 130 made of rubber or soft synthetic resin is mounted on an end portion of a parking brake pedal 110 for preventing the drivers' foot from slipping down from the parking brake pedal 110 when the driver steps on the parking brake pedal 110 and for improving the touch of the parking brake pedal 110 the driver feels when stepping on the parking brake pedal 110. A pedal arm 120 of the parking brake pedal 110 is provided at an arm end 121 with a pad mounting portion 122 of a wide width for mounting the pedal pad 130 thereon.

The parking brake pedal 110 is arranged at the left of the brake pedal over the vehicle floor ahead of the driver's seat. Thus, it is liable to occur that when the driver steps on the brake pedal, the right end portion of the parking brake pedal comes into touch with the driver's foot. That is, as viewed in FIG. 7 illustrating the reverse or wrong side of the pedal pad 130 of the parking brake pedal 110, the cause is that the thickness of a pedal pad side portion 132 of the pedal pad 130 which side portion 132 is at the upper-left side in FIG. 7 protrudes laterally beyond a pad mounting side portion 123 of the pedal arm 120. Further, when the driver steps on the parking brake pedal 110, it takes place occasionally that the right side portion of the parking brake pedal 110 comes into touch with the driver's foot.

Thus, there is the possibility that the driver's foot is caught by the pedal pad side portion 132 of the pedal pad 130, because the pedal pad side portion 132 protrudes beyond the pedal arm portion 120, as shown in FIG. 7. As also shown FIGS. 7 and 9, the pedal pad 130 has its attaching projection 132b inserted into an engaging hole 123b which is formed on the pad mounting side portion 123 of the pedal arm 120 of the parking brake pedal 110, and there is the possibility that the pedal pad 130 comes off the pad mounting upper portion 122.

The same problems as mentioned above take place not only in the parking brake pedal 110 but also in the brake pedal and the accel pedal. Pedal pads are also mounted on the end upper portions of the brake pedal and the accel pedal. Thus, when the brake pedal or the accel pedal is manipulated on foot, it may occur occasionally that the driver has his or her foot caught by the pedal pad thereof or caught by another pedal pad next thereto.

In the case of the parking braking pedal 110, it has therefore been practiced to provide a plate member 40 on the arm end 121 for preventing the pedal pad 130 from catching the driver's foot, as shown in FIGS. 10 through 12. In this case, the plate member 40 is welded to the pad mounting lower portion 124 of the pedal arm 120 so that the upper end portion of the plate member 40 covers the end portion of the pad mounting side portion 123 on which the side portion of the pedal pad 130 is mounted. Therefore, when coming into touch with the pedal pad 130, the driver's foot is guided by the plate member 40, and thus, it can be avoided the driver's foot is caught by the end portion of the pedal pad 130.

However, welding the plate member 40 to the pedal arm 120 is of time-consuming and laborious, and the cost for the plate member 40 per se has been needed, so that the use of the plate member 40 has caused an increase in cost. Furthermore, additionally attaching the plate member 40 has caused an increase in weight against the requirement for a lighter vehicle. The same problems as aforementioned are applied to the brake pedal or to the accel pedal.

SUMMARY OF THE INVENTION

It is therefore a primary object of the present invention to provide an improved pedal structure for motor vehicles which is capable of being easier to manipulate a pedal like parking foot brake pedal, brake pedal, accel pedal or the like, of being easier to manufacture and of being reduced in cost.

Briefly, according to the present invention, there is provided a pedal structure for a motor vehicle. The pedal structure comprises a pedal arm pivoted when stepped on for transmitting the stepping-on force and a pedal pad mounted on an end upper potion of the pedal arm for being stepped on by a driver's foot. The pedal pad includes a pedal pad upper portion and a pedal pad side portion. The pedal arm includes an arm body and an arm end portion for mounting the pedal pad. The arm end portion is provided with the pad mounting upper portion for mounting the pedal pad thereon and a pad mounting side portion for mounting the pedal pad side portion thereon. A protruding portion is further provided at the pad mounting side portion under the end portion of the pedal pad side portion and laterally protruding to have the same height or almost the same height as the thickness of the pedal pad side portion.

With this configuration, the arm end portion is provided with the pad mounting upper portion for mounting the pedal pad and the pad mounting side portion for mounting the pedal pad side portion thereon. And, the protruding portion is provided at the pad mounting side portion, and the pad mounting side portion and the protruding portion are made to have almost the same height in the lateral direction. Therefore, a step which would otherwise be formed between the pad mounting side portion of the pedal arm and the pedal pad side portion is removed by the presence of the protruding portion thereat. Thus, even when the driver's foot is brought into touch with the pedal pad in stepping on the parking brake pedal, it can be obviated that the driver's foot is caught by the pedal pad side portion and hence, it does not happen that pedal pad comes off the pedal arm.

In another aspect of the present invention, there is provided a parking brake pedal structure in a parking foot brake device for a motor vehicle. The parking brake pedal comprises a pedal arm pivoted when stepped on for transmitting the stepping force to the parking brake device and a pedal pad mounted on the end upper portion of the pedal arm for being stepped on by a driver's foot. The pedal arm includes an arm end portion for mounting the pedal pad thereon and an arm body connected to the parking brake device. The arm end portion is provided with a pad mounting upper portion for mounting the pedal pad thereon and a pad mounting side portion for mounting the pedal pad side portion thereon. A protruding portion is further provided at the pad mounting side portion under the end portion of the pedal pad side portion and laterally protruding to have the same height as the thickness of the pedal pad side portion.

With this configuration in another aspect, the protruding portion removes a step which would otherwise be formed between the pad mounting side portion of the pedal arm and the pedal pad side portion. Thus, when the driver's foot is brought into touch with the pedal arm in stepping on the parking brake pedal, it can be obviated that the driver's foot is caught by the pedal pad side portion and hence, it does not happen that pedal pad comes off the pedal arm.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
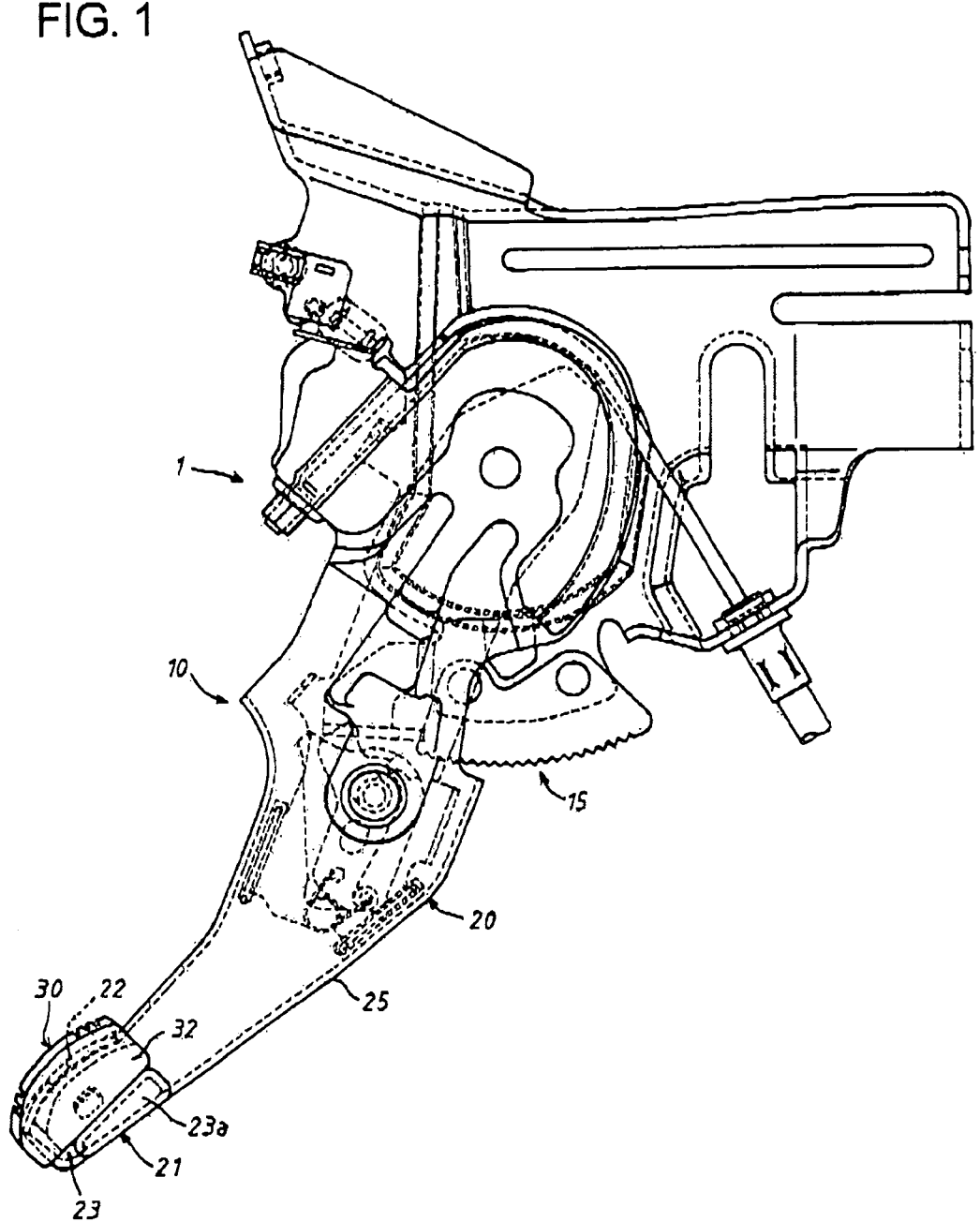
FIG. 1 is a general side view showing the whole of a parking brake device in an embodiment according to the present invention.
Figure 2:
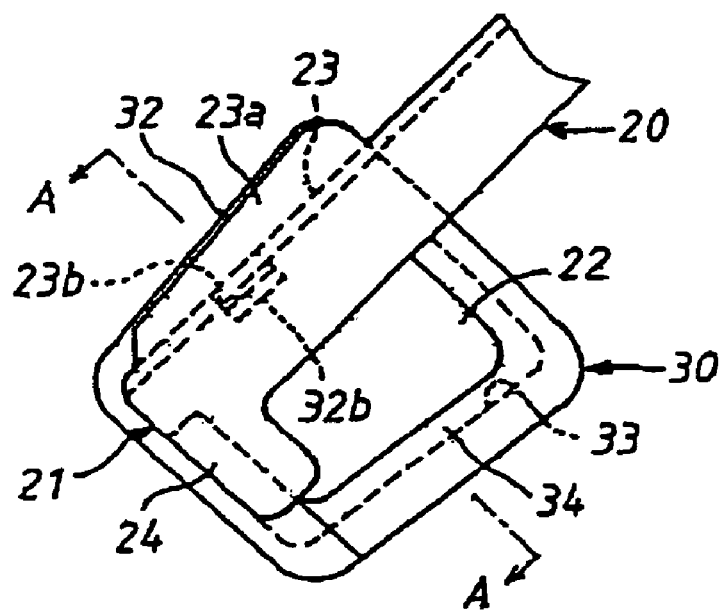
FIG. 2 is an enlarged fragmentary view showing the bottom of an end portion of a pedal arm which constitutes a parking brake pedal shown in FIG. 1.
Figure 3:
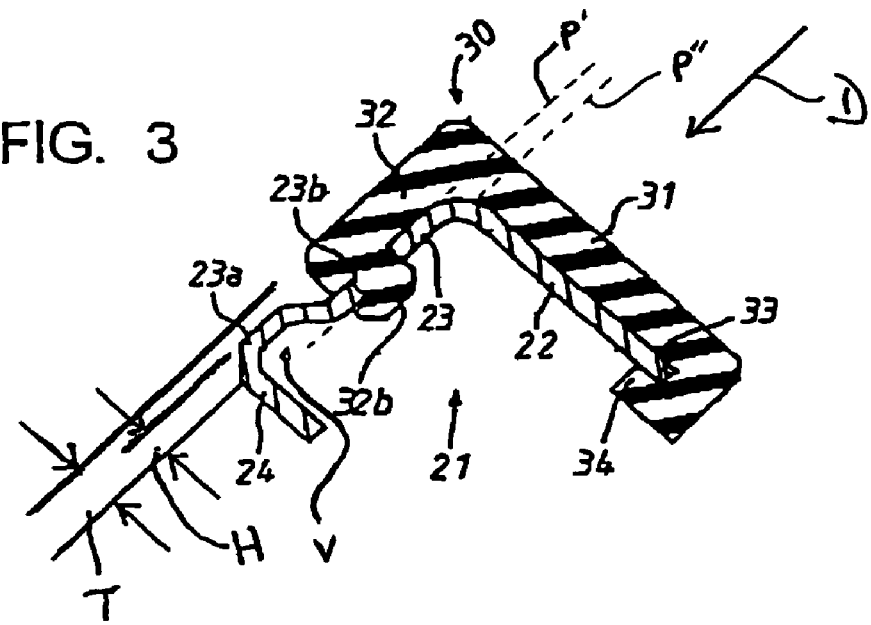
FIG. 3 is an enlarged sectional view taken along the line A—A in FIG. 2.
Figure 4:
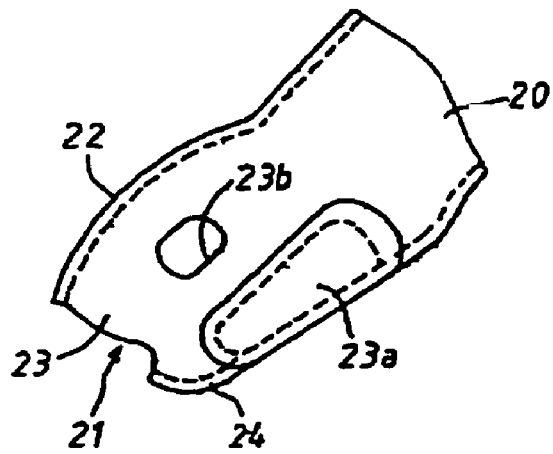
FIG. 4 is an enlarge fragmentary side view of the end portion of the pedal arm of the parking brake pedal shown in FIG. 1.

Hereinafter, a pedal structure for motor vehicle like parking brake pedals, brake pedals and gas or accel pedals which are the embodiments according to the present invention will be described with r ference to the drawings, taking as an example a parking brake pedal of a parking foot brake d vice for a motor vehicle. Brake pedals and accel pedals are almost the same as parking brake pedals in the configuration of their pedal pads and arm ends of pedal arms. FIG. 1 is a general side view showing the whole of the parking brake device in an embodiment, and FIGS. 2 to 4 are enlarged fragmentary views each showing the arm end portion of the parking brake device in the embodiment.

As shown in FIG. 1, the parking foot brake device 1 for motor vehicles is used in parking a motor vehicle (e.g., automobile). When a parking brake pedal 10 is stepped on and displaced in a braking direction D to work the parking brake, the parking brake is brought into a locking state to keep the motor vehicle being braked, so that the parking brake device 1 can prevent the motor vehicle from moving during the parking. Usually, the parking brake device 1 is arranged over the floor ahead of the driver's seat of the motor vehicle in juxtaposed relation with a brake pedal (not shown). The structure of the parking brake device 1 is such that in parking the motor vehicle, the parking brake pedal 10 is stepped on to work the parking brake and to bring the same into a locking state, while in driving the motor vehicle, the parking brake pedal 10 is returned to a non-braking position to release the parking braking from the locking state.

The parking brake device 1 is composed of the parking brake pedal 10 and a lock device 15 for the same. The parking brake pedal 10 includes a pedal arm 20 for transmitting the stepping-on force of the driver's foot and a pedal pad 30 provided at the end portion of the pedal arm 20.

The pedal arm 20 is composed of an arm body 25 for transmitting the force to a lock device and an arm end portion 21 at the end portion of the arm body 25. As shown in FIGS. 2 and 3, the arm end portion 21 has the pedal pad 30 attached to the upper portion thereof. FIG. 2 is a bottom view observing the arm end portion 21 from the back thereof, and FIG. 3 is a sectional view taken along the line A—A in FIG. 2.

The arm body 25 of the pedal arm 20 is made by press-forming a sheet metal and takes a cup or U-letter shape in cross-section. Being made by press-forming, the arm body 25 is easier to manufacture, suitable for mass-production and can be of a lower cost. Further, taking the U-letter shape in cross-section, the arm body 25 has a sufficient rigidity against the stepping-on force exerted thereon. Furthermore, being made of a sheet metal, being easier to process and being formed with a vacant space inside the U-letter shape cross-section, the pedal arm 20 can be lightened thereby to help a lighter vehicle. In addition, since a side portion of the U-letter shape portion is made to be a pad mounting side portion 23, the mounting of the pedal pad 30 can be done easily.

The cross-section of the arm end portion 21 remains almost the U-letter shape, as shown in FIG. 3. However, a pad mounting upper portion 22 of almost a quadrilateral or a four-sided figure is formed at the arm end portion 21 for mounting the pedal pad 30 thereon. The pad mounting upper portion 22 takes a semicylindrical shape whose center portion swells out slightly, as shown in FIG. 4.

Further, a pad mounting side portion 23 is formed at the side surface of almost the U-shape cross-section and extends laterally with respect to the pad mounting upper portion in the brake force applying direction D. The pad mounting side portion 23 is provided with an engaging hole 23b for securing a pedal pad side portion 32 of the pedal pad 30 and is further provided with a protruding portion 23a. The protruding portion 23a is press-formed at the same time as the pedal arm 20 is press-formed. That is, the forming of the protruding portion 23a and the forming of the pedal arm 20 are done through the same press-forming process, whereby the portions 22, 23 and 23a of the pedal arm 20 comprise respective portions of the same piece of material. Thus, it is unnecessary to attach, by welding or the like, another member for constituting the protruding portion 23a to the pedal arm 20. Therefore, the pedal arm 20 does not increase in weight, and the cost for processing the pedal arm 20 is minimized, so that the provision of the protruding portion 23a hardly gives rise to an increase in cost.

The portion that forms a lower part of an almost cup or U-letter shape cross-section is a pad mounting lower portion 24, whose end portion is bent to extend in a direction opposite to the pad mounting side portion 23 thereby to form an L-letter shape. At the extreme end of the arm end portion 21, the extreme ends of the pad mounting upper portion 22, the pad mounting side portion 23 and the pad mounting lower portion 24 are closed to form an integral flat surface which connects these three extreme ends continuously.

The pedal pad 30 is mounted on the arm end portion 21. The pedal pad 30 is made of rubber or soft synthetic resin. Thus, when the parking brake pedal 10 is stepped on, the softness of the rubber or the soft synthetic resin improves the driver's feeling in stepping on the brake pedal 10. Further, the rubber or the soft synthetic resin works to prevent the driver's foot being slipped down from the parking brake pedal 10 when the driver steps on the same.

Figure 5:
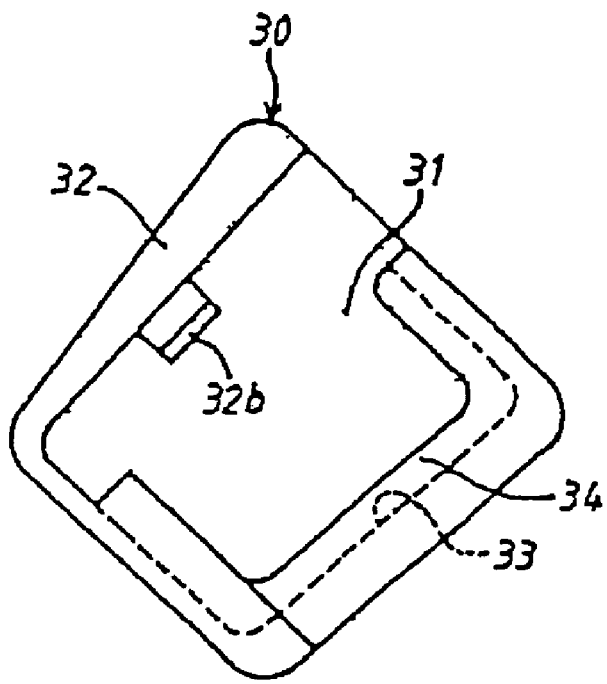
FIG. 5 is an enlarged view showing the bottom of a pedal pad per se which is mounted on an end upper portion of the pedal arm.

As shown in FIG. 5, the pedal pad 30 comprises a pedal pad upper portion 31 mounted on the pad mounting upper portion 22 and a pedal pad side portion 32 mounted on the pad mounting side portion 23 and take an almost L-shape in cross-section, as shown in FIG. 3. The pedal pad side portion 32 is formed with a mounting projection 32b, and the pedal pad upper portion 31 is formed with a pad groove 33 and a pad cover portion 34 at its circumferential portion. Like the pad mounting upper portion 22, the pedal pad upper portion 31 takes a semicylindrical shape with the center portion protruding out slightly.

In the configuration of the protruding portion 23a shown in FIG. 3, the part of the pad mounting side portion 23 at which the pedal pad 30 is mounted includes an outer surface which faces the pedal pad 30 and an oppositely facing inner surface. The outer surface of this part of the pad mounting side portion 23 lies in a first plane P' oriented substantially parallel to the braking direction D, and the oppositely facing inner surface lies in a second plane P'''. As shown in FIG. 3, the protruding portion 23a is disposed outside the first plane P' and laterally opposite a void V in the arm end portion 21. As further illustrated in FIG. 3, this void V exists or is located between the inner surface of the protruding portion 23a and the second plane P'''.

In mounting the pedal pad 30 on the arm end portion 21 of the pedal arm 20, first of all, the circumferential portion of the pad mounting upper portion 22 provided at the arm end portion 21 is fit in the pad groove 33 of the pedal pad 30. Then, the back surface of the pedal pad upper portion 31 of the pedal pad 30 is brought into touch with the pad mounting upper portion 22 provided at the arm end portion 21. Further, the pedal pad side portion 32 of the pedal pad 30 is brought into touch with the pad mounting side portion 23 of the pedal arm 20, and the mounting projection 32b of the pedal pad side portion 32 is inserted into the engaging hole 23b.

Thus, the pedal pad 30 is secured to the pedal arm 20. Since the circumferential portion of the pedal pad 30 has the pad cover portion 34 which covers the circumferential portion of the back surface of the pad mounting upper portion 22 and secures to wrap up the circumferential portion of the pad mounting upper portion 22, the pedal pad 30 can be firmly secured to the pad mounting upper portion 22.

In this particular embodiment, as understood from the foregoing description, the protruding portion 23a is provided at the pad mounting side portion 23 of the arm end portion 21 and laterally protrudes almost to the same height h (i.e., to almost the same lateral distance) as the thickness T of the pedal pad side portion 32 of the pedal pad 30. Accordingly, a step which would otherwise be formed between the pad mounting side portion 23 of the pedal arm 20 and the pedal pad side portion 32 is eliminated or removed by the presence of the protruding portion 23a thereat. Thus, when the driver's foot is brought into touch with the pedal arm 20 in stepping on the parking brake pedal 10, it can be obviated that the driver's foot is caught by the pedal pad side portion 32 and hence, it hardly takes place that pedal pad 30 comes off the pedal arm 20.

Figure 6:
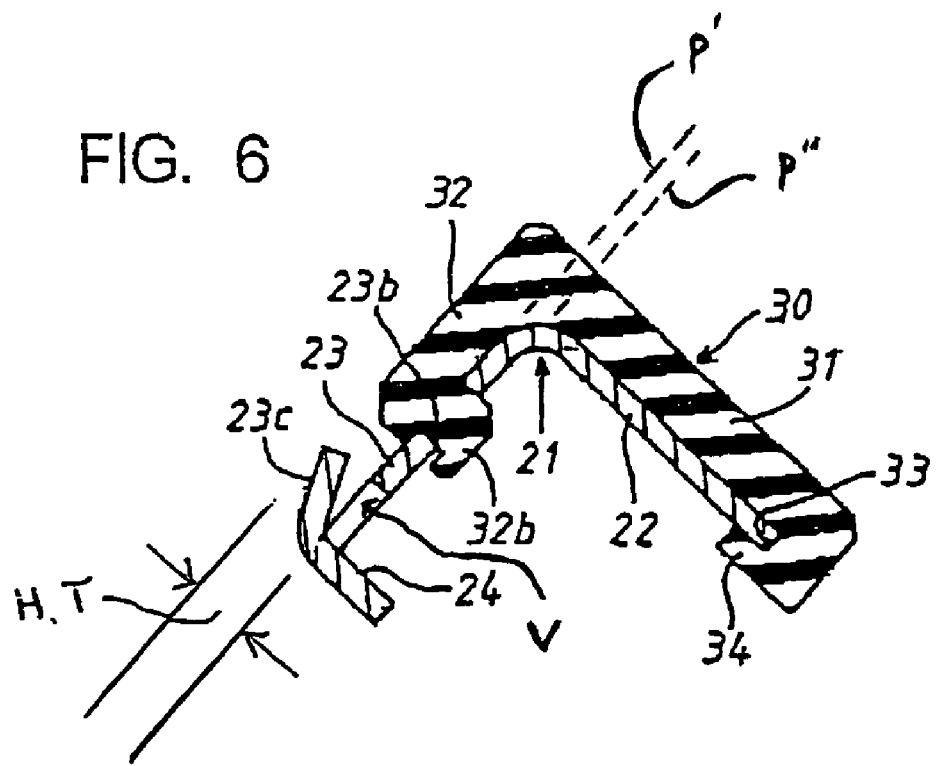
FIG. 6 is an enlarged sectional view taken along the line A—A in FIG. 2 but showing that in another or second embodiment.
Figure 7:
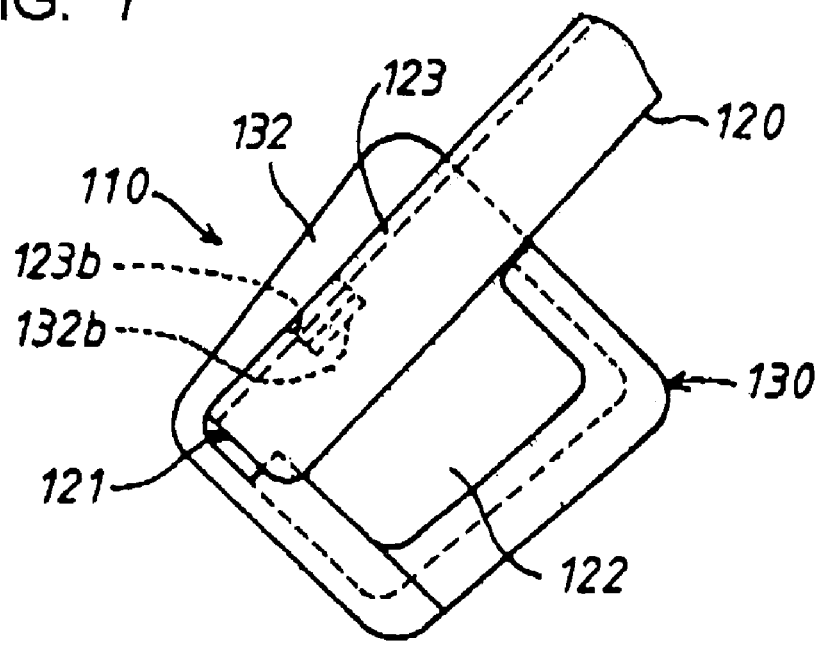
FIG. 7 is an enlarged fragmentary view showing the bottom of an end portion of a pedal arm which constitutes a parking brake pedal in a parking brake device known as prior art.
Figure 8:
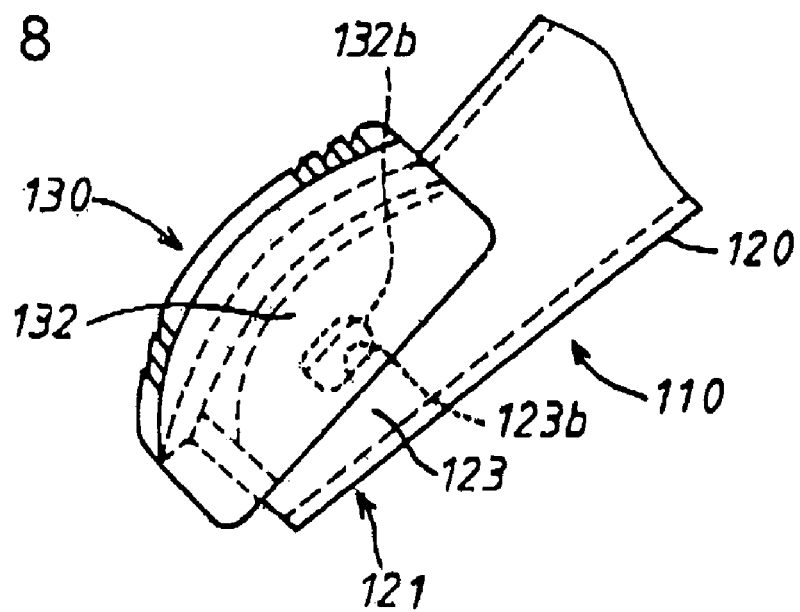
FIG. 8 is an enlarge fragmentary side view showing the end portion of the pedal arm in the known parking brake device.
Figure 9A:
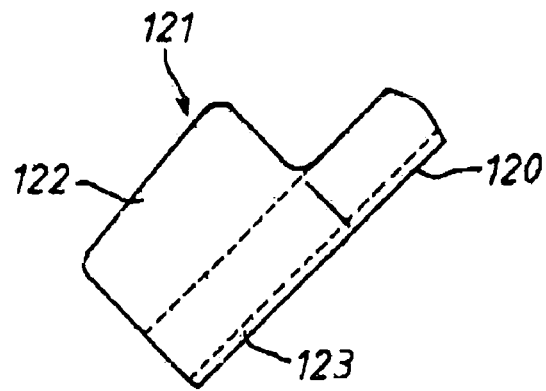
FIG. 9(A) is a fragmentary top view showing without a pedal pad the end portion of the pedal arm in the known parking brake device.
Figure 9B:
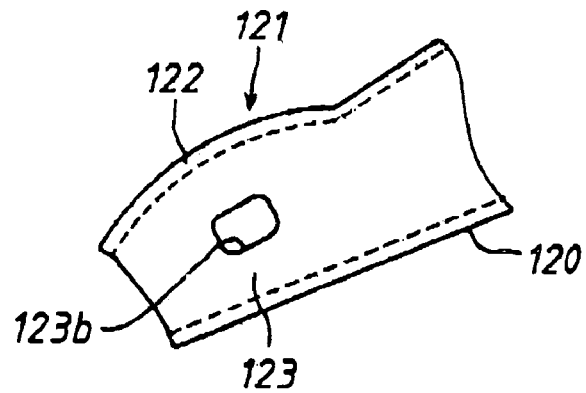
FIG. 9(B) is a fragmentary side view showing the end portion of the pedal arm shown in FIG. 9(A)
Figure 10:
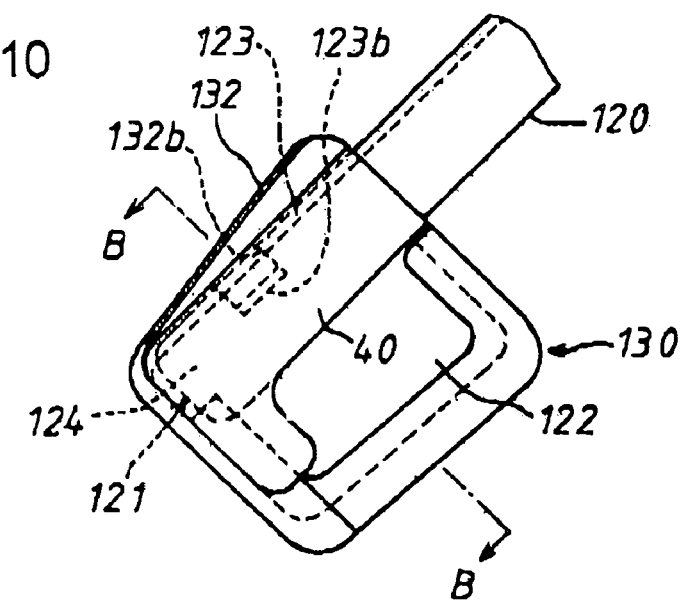
FIG. 10 is an enlarged fragmentary view showing the bottom of an end portion of a pedal arm which constitutes a parking brake pedal in another parking brake device also known as second prior art.
Figure 11:
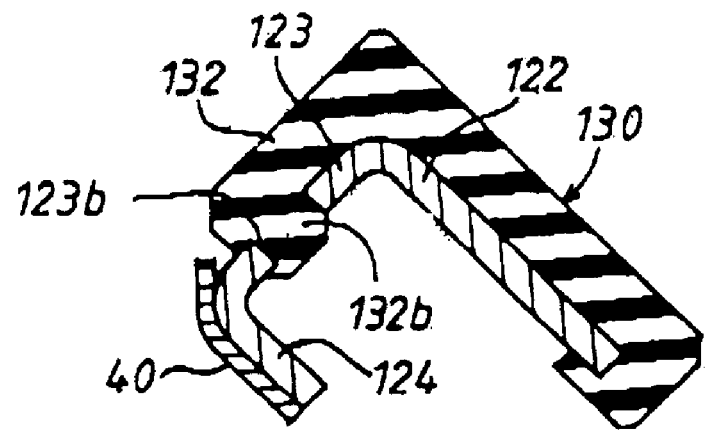
FIG. 11 is an enlarged sectional view taken along the line B—B in FIG. 10.
Figure 12:
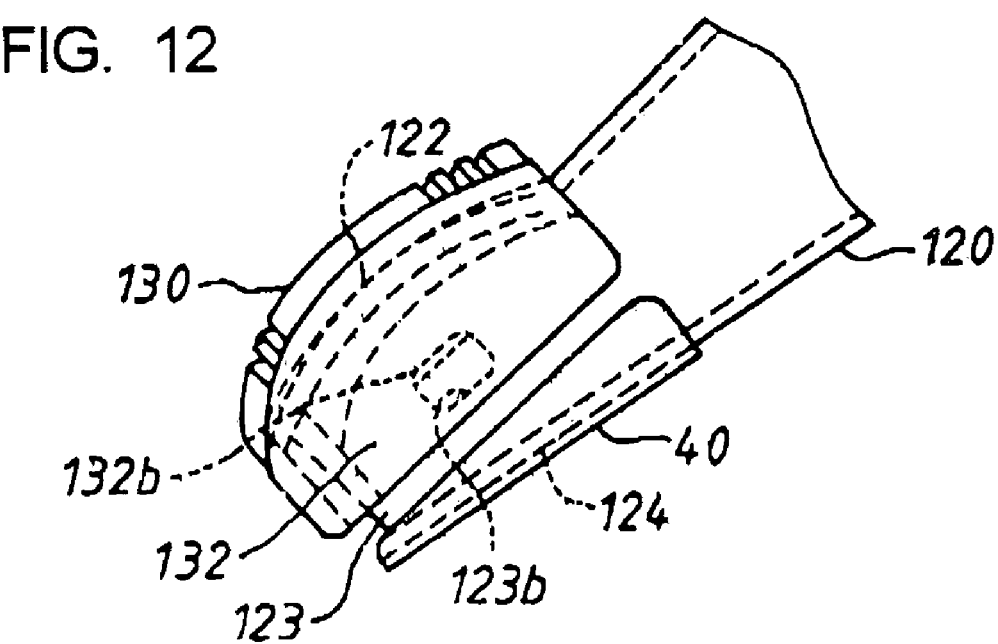
FIG. 12 is an enlarged fragmentary side view showing the end portion of the pedal arm in the parking brake device also known as the second prior art.

In stead of forming at the arm end portion 21 the protruding portion 23a which protrudes out as shown in FIG. 3, there may be provided a cut raised portion 23c which is cut and raised too the same height H as the thickness T of the pedal pad side portion 32, as shown in FIG. 6. The cutting and raising process makes it easier to increase the height H of the cut raised portion 23c and easier to machine.

In the configuration of the protruding portion 23c shown in FIG. 6, the part of the pad mounting side portion 23 at which the pedal pad 30 is mounted includes an outer surface which faces the pedal pad 30 and an oppositely facing inner surface. The outer surface of this part of the pad mounting side portion 23 lies in a first plane P' oriented substantially parallel to the braking direction, and the oppositely facing inner surface lies in a second plane P'''. As shown in FIG. 6, the protruding portion 23c is disposed outside the first plane P' and laterally opposite a void V in the arm end portion 21. As further illustrated in FIG. 6, this void V exists or is located between the inner surface of the protruding portion 23c and the second plane P'''.

In a modified form of the embodiment, an adhesive or bonding agent may be employed to attach the pedal pad 30 to the pedal arm 20. That is, the adhesive is applied to the back surface of the pedal pad 30 or to the upper surface of the pad mounting upper portion 22 of the pedal arm 20, and then, the pedal pad 30 and the pad mounting upper portion 22 are attached to each other. Thus, the pedal pad 30 can be firmly secured to the pedal arm 20.

In this modified case, since the mounting is done using the adhesive and can be done only by applying the adhesive, the work for mounting is simple. The use of the adhesive may make it possible to omit or remove the mounting projection 32b, the pad groove 33 and the pad cover portion 34 from the pedal pad 30. Where these portions are omitted or removed from the pedal pad 30, the weight of the pedal pad can be reduced, and the shape of the pedal pad 30 can be simplified, so that the pedal pad 30 becomes easier to manufacture and reduced in cost.

A so-called "Insert Forming" technology which has been known in the art can be utilized to manufacture the pedal pad 30. In the technology, the arm end portion 21 of the pedal arm 20 is placed within a cavity which is formed in a casting mold (not shown) for forming the pedal pad 30, and then, rubber or soft synthetic resin is ejected or injected into the cavity. The Insert Forming technology is implemented to form the pedal pad 30 bodily with the arm end portion 21, and the rubber or the soft synthetic resin is brought into touch with the arm end portion 21 while it is being molten at a high temperature, so that the pedal pad 30 can be firmly secured to the arm end portion 21.

Further, since the rubber or the soft synthetic resin is ejected or injected with the arm end portion 21 being set in the casting mold, the forming of the pedal pad 30 and the mounting of the pedal pad 30 on the pad mounting upper portion 22 of the arm end portion 21 can be done simultaneously, the manufacturing of the pedal arm 20 becomes of the time and labor-saving and can be reduced in manufacturing cost. Particularly, in the case that the pedal pad 30 is made of rubber, the pedal pad 30, while being vulcanized, is joined to the pad mounting upper portion 22 of the arm end portion 21, so that the joining of the pedal pad 30 to the pad mounting upper portion 22 can be further strengthened.

Although in the foregoing embodiment, the present invention is applied to the parking foot brake pedal, it can be also applied to various other pedals for motor vehicles such as accel or gas pedals, brake pedals, clutch pedals and the like.

Finally, various features and many of the attendant advantages of the foregoing embodiment will be summarized as follows:

That is, in the foregoing embodiment as shown in FIGS. 2 and 3 for example, the arm end portion 21 is provided with the pad mounting upper portion 22 for mounting the pedal pad 30 and the pad mounting side portion 23 for mounting the pedal pad side portion 32 thereon. And, the protruding portion 23*a* is provided at the pad mounting side portion 23, and the pedal pad side portion 32 and the protruding portion 23*a* are made to have almost the same height in the lateral direction. Therefore, a step which would otherwise be formed between the pad mounting side portion 23 of the pedal arm 20 and the pedal pad side portion 32 is removed by the presence of the protruding portion 23*a* thereat. Thus, when the driver's foot is brought into touch with the pedal arm 20 in stepping on the parking brake pedal 10, it can be obviated that the driver's foot is caught by the pedal pad side portion 32 and hence, it hardly occurs that pedal pad 30 comes off the pedal arm 20.

In the foregoing embodiment as shown in FIGS. 2 and 3 for example, the arm end portion 21 of the parking brake pedal 10 is provided at the pad mounting side portion 23 with the protruding portion 23*a*, which is made to have almost the same height H in the lateral direction as the thickness T of the pedal pad side portion 32. Thus, there is present the protruding portion 23*a* for removing the step which would otherwise be formed between the pad mounting side portion 23 of the pedal arm 20 and the pedal pad 30. Therefore, when the driver's foot is brought into touch with the pedal arm 20 in stepping the parking brake pedal 10, it hardly takes place that the driver's foot is caught by the pedal pad side portion 32, and hence, that pedal pad 30 comes off the pedal arm 20.

In the foregoing embodiment, the pedal arm 20 is formed to be a U-letter shape in cross-section and can be made of a metal sheet. Therefore, since the pedal arm 20 is easier to process and is able to form a space inside the U-letter shape cross-section, it can be lightened thereby to help lightening the vehicle. Further, since the side portion of the U-letter shape cross-section can be utilized to be the portion for mounting the pedal pad side portion 32 thereon, the mounting of the pedal pad 30 becomes easier.

In the foregoing embodiment as shown in FIG. 3 for example, since the pedal arm 20 is formed by press-forming, the machining of the U-letter shape cross-section can be done quickly and easily, so that a substantial reduction in cost can be attained in manufacturing the pedal arm 20. Further, since the swelling portion 23*a* can be formed by press-forming at the same time as the forming of the U-letter shape cross-section, it is unnecessary to attach another member constituting the protruding portion 23*a*, to the pedal arm 20 by welding, and there is no increase in weight. In addition to these, the cost for machining the protruding portion 23*a* can be minimized, and therefore, the provision of the protruding portion 23*a* does not result in a substantial increase in cost.

In the foregoing second embodiment as shown in FIG. 6 for example, since the protruding portion 23*a* is made as the cut raised portion 23*c* which is formed by cutting and raising a part of the pad mounting side portion 23 of the pedal arm 20, it is unnecessary to attach another plate member by welding or the like, so that there is no increase in weight. Further, since the cut and raised portion 23*c* (i.e., corresponding to the swelling portion 23*a*) is formed by press-forming at the same time as the machining of the U-letter shape cross-section, the machining cost therefor can be minimized, and the provision of the cut raised portion 23*c* does not result in a substantial increase in cost.

In the foregoing embodiment as shown in FIGS. 2 and 3 for example, since the pedal pad 30 takes such configuration not only as to cover the whole of the surface of the pad mounting upper portion 22, but also to cove the circumferential portion of the back surface of the pad mounting upper portion 22, not only the whole of the upper surface but also the circumferential portion of the back surface of the pad mounting upper portion 22 can be covered by providing the circumferential portion of the pedal pad 30 with a pad groove 33 as a mounting recess and by fitting the circumferential portion of the pad mounting upper portion 22 in the pad groove 33 of the pedal pad 30. Thus, assembling the pedal pad 30 to the pad mounting upper portion 22 becomes easier. In addition, since the circumferential portion of the pedal pad 30 covers the circumferential portion of the back surface of the pad mounting upper portion 22, it hardly takes place that the pedal pad 30 comes off the pad mounting upper portion 22.

In a modified form of the foregoing embodiment, since the pedal pad 30 is attached by an adhesive to the pad mounting upper portion 22 of the arm end portion 21, it is firmly glued to the pad mounting upper portion 22, so that the pedal pad 30 hardly comes off the pad mounting upper portion 22. In addition, attaching the pedal pad 30 can be done only by applying the adhesive to the pad mounting upper portion 22, and thus, the attaching work is simple and easy.

In a modified form of the foregoing embodiments as shown in FIGS. 3 and 6 for example, since the pedal pad 30 is made of rubber or soft synthetic resin, it can be firmly secured to the arm and portion 21 by integrally forming the pedal pad 30 on the arm end portion 21 of the pedal arm 20 utilizing the Insert Forming technology.

In the last mentioned modified form of the foregoing embodiment, since the rubb r or the soft synthetic resin is formed by being ejected or injected into the casting mold with the arm end portion 21 being set in the casting mold, the forming of the pedal pad 30 can be done simultaneously with the mounting of the pedal pad 30 onto the pad mounting upper portion 22. Thus, the forming and mounting of the pedal pad 30 become of the time and labor-saving and can be reduced in costs. Particularly, in the case of the pedal pad 30 being made of rubber, the mounting of the pedal pad 30 to the pad mounting upper portion 22 of the arm end portion 21 can be done through vulcanization joining during the vulcanizing process of the rubber, so that the pedal pad 30 can be firmly secured to the pad mounting upper portion 22.

Obviously, other numerous modifications and variations of the present invention are possible in light of the above teachings. It is therefore to be understood that within the scope of the appended claims, the present invention may be practiced otherwise than as specifically described herein.

What is claimed is:

1. A pedal structure for a motor vehicle comprising:
   a pedal arm pivoted when stepped on for transmitting the stepping-on force in a braking direction; and
   a pedal pad mounted on an end upper portion of said pedal arm for being stepped on by a driver's foot;
   said pedal pad including a pedal pad upper portion and a pedal pad side portion extending laterally with respect to said upper portion generally in said braking direction;
   said pedal arm including an arm end portion for mounting said pedal pad and an arm body;
   said arm end portion having a pad mounting upper portion for mounting said pedal pad, and a pad mounting side portion extending laterally with respect to said pad mounting upper portion generally in said braking direction for mounting said pedal pad side portion by a coupling between said pedal pad side portion and said pad mounting side portion, said pad mounting side portion having a protruding portion disposed beneath said pedal pad side portion and protruding with respect to said pad mounting side portion in a direction laterally of said braking direction to have almost the same height as the thickness of said pedal pad side portion;
   said pad mounting upper portion, said pad mounting side portion, and said protruding portion comprising respective portions of the same piece of material; and
   said pad mounting side portion lying in a plane oriented substantially parallel to said braking direction, said protruding portion being disposed outside of said plane and laterally opposite a void in said arm end portion.

2. The pedal structure as set forth in claim 1, wherein said pedal arm is formed to be a U-letter shape in cross-section.

3. The pedal structure as set forth in claim 1, wherein said pedal pad covers the whole of the right side of said pad mounting upper portion provided at said arm end portion and also covers the circumferential portion of the wrong side of said pad mounting upper portion.

4. A parking brake pedal structure in a parking foot brake device for a motor vehicle wherein a parking brake pedal comprises;
   a pedal arm pivoted when stepped on for transmitting the stepping-on force to said parking brake device in a braking direction; and
   a pedal pad mounted on an end upper portion of said pedal arm for being stepped on by a driver's foot;
   said pedal arm including an arm end portion for mounting said pedal pad and an arm body connected to said parking brake device; and
   said arm end portion having a pad mounting upper portion for mounting said pedal pad, and a pad mounting side portion extending laterally with respect to said pad mounting upper portion generally in said braking direction for mounting said pedal pad side portion by a coupling between said pedal pad side portion and said pad mounting side portion, said pad mounting side portion having a protruding portion disposed beneath said pedal pad side portion and protruding with respect to said pad mounting side portion in a direction laterally of said braking direction to have the same height as the thickness of said pedal pad side portion,
   said pad mounting upper portion, said pad mounting side portion, and said protruding portion comprising respective integral portions of the same piece of material, and
   a part of said pad mounting side portion at which said pedal pad side portion is mounted possessing an outer surface which faces said pedal pad side portion and lies in a first plane oriented substantially parallel to said braking direction and an oppositely facing inner surface that lies in a second plane;
   said protruding portion possessing an outer surface and an oppositely facing inner surface;
   said protruding portion being disposed outside of said first plane and laterally opposite a void in said arm end portion that is positioned between the inner surface of said protruding portion and the second plane.

5. The pedal structure as set forth in claim 4, wherein said pedal arm is formed to be a U-letter shape in cross-section.

6. The pedal structure as set forth in claim 4, wherein said pedal pad covers the whole of the right side of said pad mounting upper portion provided at said arm end portion and also covers the circumferential portion of the wrong side of said pad mounting upper portion.

* * * * *